United States Patent
Antoine et al.

(10) Patent No.: US 10,694,528 B2
(45) Date of Patent: Jun. 23, 2020

(54) METHOD FOR ANALYZING FREQUENCY RESOURCES AND SELECTING TRANSMISSION FREQUENCY IN A WIRELESS COMMUNICATION SYSTEM

(71) Applicant: SIGFOX, Labege (FR)

(72) Inventors: Patrick Antoine, Cugnaux (FR); Guillaume Fumat, Toulouse (FR); Raoul Mallart, Paris (FR); Stéphane Baills, Toulouse (FR)

(73) Assignee: SIGFOX, Labege (FR)

( * ) Notice: Subject to any disclaimer, the term of this patent is extended or adjusted under 35 U.S.C. 154(b) by 119 days.

(21) Appl. No.: 15/751,869

(22) PCT Filed: Aug. 8, 2016

(86) PCT No.: PCT/FR2016/052051
§ 371 (c)(1),
(2) Date: Feb. 11, 2018

(87) PCT Pub. No.: WO2017/025686
PCT Pub. Date: Feb. 16, 2017

(65) Prior Publication Data
US 2018/0242333 A1    Aug. 23, 2018

(30) Foreign Application Priority Data

Aug. 12, 2015   (FR) .................................. 15 57691

(51) Int. Cl.
*H04W 72/08* (2009.01)
*H04W 4/70* (2018.01)
(Continued)

(52) U.S. Cl.
CPC ........... *H04W 72/085* (2013.01); *H04W 4/70* (2018.02); *H04W 24/10* (2013.01); *H04W 36/06* (2013.01);
(Continued)

(58) Field of Classification Search
CPC ... H04W 72/085; H04W 36/30; H04W 36/06; H04W 24/10; H04W 4/70; H04W 72/0453
See application file for complete search history.

(56) References Cited

U.S. PATENT DOCUMENTS

2004/0203436 A1 * 10/2004 Oesterling ............. H04B 17/20
455/67.11
2013/0155879 A1    6/2013 He et al.
(Continued)

OTHER PUBLICATIONS

Tragos et al., "Cognitive Radio Inspired M2M Communications," 2013 16th International Symposium on Wireless Personal Multimedia Communications (WPMC), Jun. 24, 2013, pp. 1-5.

*Primary Examiner* — Jackie Zuniga Abad
(74) *Attorney, Agent, or Firm* — Im IP Law; Chai Im; C. Andrew Im (57) ABSTRACT

A method for analyzing frequency resources within a predetermined multiplexing band. For at least one base station, capabilities for detecting uplink messages respectively in different frequency sub-bands within the multiplexing band are estimated. For each frequency sub-band, a predetermined service quality criterion is assessed depending on the detection capability estimated for the frequency sub-band. A spectral map of service quality for the base station is transmitted. The spectral map is representative of the frequency sub-bands for which the service quality criterion has been verified and the frequency sub-bands for which the service quality criterion has not been verified.

19 Claims, 3 Drawing Sheets

(51) Int. Cl.
*H04W 72/04* (2009.01)
*H04W 24/10* (2009.01)
*H04W 36/06* (2009.01)
*H04W 36/30* (2009.01)

(52) U.S. Cl.
CPC ....... *H04W 36/30* (2013.01); *H04W 72/0453* (2013.01)

(56) References Cited

U.S. PATENT DOCUMENTS

2013/0259012 A1* 10/2013 Gormley ........... H04W 72/0473
370/336
2015/0055570 A1 2/2015 Viorel et al.
2018/0014217 A1* 1/2018 Kleinbeck ............. H04W 24/10

\* cited by examiner

METHOD FOR ANALYZING FREQUENCY RESOURCES AND SELECTING TRANSMISSION FREQUENCY IN A WIRELESS COMMUNICATION SYSTEM

RELATED APPLICATIONS

This application is a § 371 application from PCT/FR2016/052051 filed Aug. 8, 2016, which claims priority from French Patent Application No. 15 57691 filed Aug. 12, 2015, each of which is incorporated herein by reference in its entirety.

TECHNICAL FIELD

The present invention relates to the field of telecommunications. More particularly, the present invention relates to the management of frequency resources in a wireless communication system including an access network and terminals, and wherein the selection of the transmission frequencies, over which the terminals transmit uplink messages to the access network, is carried out by said terminals.

BACKGROUND OF THE INVENTION

The present invention can be used in a particularly advantageous but nonlimiting manner in wireless communication systems of the M2M (Machine-to-Machine) type or of the "Internet of Things" (IoT) type.

In the context, for example, of the IoT, each object of everyday life is destined to become a communicating object, and, to this end, is equipped with a terminal suitable for transmitting data to an access network. However, it is understood that, insofar as is possible, the cost of the terminal should not significantly impact upon that of the object to which it is added, such as to make many objects of everyday life communicate. As a result, the complexity of the terminals must be reduced as far as possible, in order to reduce the manufacturing cost thereof.

To this end, in a wireless communication system for the IoT, the terminals are preferentially not synchronized with regard to time and frequencies with the access network, and alone decide the transmission instants and the transmission frequencies for uplink messages intended for said access network, within a predetermined frequency band, called a "multiplexing band". The complexity therefore rests mainly with the access network, which must be able to receive uplink messages transmitted at arbitrary transmission instants and over arbitrary transmission frequencies within the multiplexing band, while the terminals can be simple and inexpensive to manufacture.

Furthermore, the terminals preferably transmit without verifying the availability of the selected transmission frequency, in order to reduce the measures to be carried out and the associated power consumption.

To reduce the costs of implementing a wireless communication system for the IoT, it is also advantageous to use a freely available multiplexing band. For example, the ISM ("Industrial, Scientific and Medical") band includes frequency bands that are said to be free in that they can be used without prior administrative authorization, subject to observing some regulatory constraints.

However, the result is that the level of interference within the multiplexing band can be great. As a result, if the terminal selects a transmission frequency without carrying out prior measurements, said transmission frequency can have a high level of interference, such that the transmitted uplink message will not be detected by the access network.

In order to overcome this problem, the terminal can, however, regularly select a new transmission frequency, in order to reduce the probability of all of the uplink messages from said terminal not being transmitted over transmission frequencies having high levels of interference.

If, generally, the wireless communication systems for the IoT can tolerate the possibility of some uplink messages being missed by the access network, there are nevertheless uses for which it can be necessary to provide a minimum level of quality of service.

For example, it can be necessary to ensure that at least one uplink message can be received by the access network over a predetermined duration period. In the case, for example, of remote reading of gas, water, electricity, etc., meters, the receipt of at least one uplink message over a period of one month can prove to be sufficient. In the case of remote monitoring of buildings or houses, and particularly in the case of a break-in or a water or gas leak, it can be necessary to ensure that at least one uplink message can be received over a much shorter period, for example less than one hour.

OBJECT AND SUMMARY OF THE INVENTION

The aim of the present invention is to overcome all or some of the limitations of the prior art solutions, particularly those disclosed above, by proposing a solution that allows, in some cases, a minimum level of quality of service to be provided, while retaining terminals that are simple and inexpensive to manufacture.

To this effect, and according to a first aspect, the invention relates to a method for analyzing, using an access network of a wireless communication system, frequency resources within a predetermined multiplexing band, said wireless communication system including at least one terminal configured to select a transmission frequency, within the multiplexing band, over which to transmit an uplink message to the access network, including:

- estimating, for at least one base station of the access network, capabilities for detecting uplink messages in different frequency sub-bands, respectively, within the multiplexing band,
- assessing, for each frequency sub-band, a predetermined quality-of-service criterion as a function of the detection capability estimated for said frequency sub-band,
- transmitting, using the access network, a quality-of-service spectral map for said base station, representative of the frequency sub-bands for which the quality-of-service criterion has been verified and of the frequency sub-bands for which said quality-of-service criterion has not been verified.

Thus, the analysis method is based, on the access network side, on estimating detection capabilities, for at least one base station of the access network, in different frequency sub-bands of the multiplexing band. Each detection capability represents, for the frequency sub-band in question and the base station in question, the probability that an uplink message, transmitted by the terminal over a transmission frequency within this frequency sub-band, can be detected by this base station.

Then, the access network determines the detection capabilities for which a predetermined quality-of-service criterion, associated with a quality-of-service predetermined level, is verified. The access network then transmits, to the terminal, a quality-of-service spectral map representative of the frequency sub-bands for which the quality-of-service criterion is verified and of those for which the quality-of-service criterion is not verified. In other words, the quality-of-service spectral map indicates the frequency sub-bands to be favored for transmitting uplink messages in order to provide a quality-of-service predetermined level.

Transmitting the quality-of-service spectral map, rather than directly transmitting the detection capabilities, makes it possible to reduce the amount of data to be transmitted. Indeed, the data amount required to encode the quality-of-service spectral map is limited, approximately $N_{SB}$ bits, $N_{SB}$ being the number of frequency sub-bands considered within the multiplexing band.

Therefore, the terminal continues, as is the case in the prior art, to alone decide the transmission frequency over which to transmit an uplink message, without needing to link up in advance with a base station in order to be assigned a frequency resource thereby. However, thanks to the transmission by the access network of the quality-of-service spectral map, the selection performed by the terminal can favor some frequency sub-bands if it is necessary to provide a quality-of-service predetermined level.

The impact on the terminals is limited since, for many uses, it is already required that the terminals can receive downlink messages transmitted by the access network (for example to reconfigure a terminal, to control an actuator connected to said terminal, etc.). Furthermore, since the amount of data to be received is low, the impact on the power consumption of the terminals is limited.

In particular modes of implementation, the analysis method can further include one or more of the following features, taken separately or according to all the technically possible combinations.

In particular modes of implementation, the analysis method includes assessing, for each frequency sub-band, at least two different predetermined quality-of-service criteria as a function of the detection capability estimated for said frequency sub-band, and transmitting at least two quality-of-service spectral maps associated with said different quality-of-service criteria, respectively.

Such arrangements make it possible to provide different quality-of-service levels, which can be associated with different uses (for example remote reading and remote monitoring), with different terminal groups, etc., respectively.

In particular modes of implementation, the detection capability in a frequency sub-band for a base station is estimated as a function of a total signal representing all of the radio signals received by said base station in said frequency sub-band over a time window, and includes:
  calculating a spectrogram representing the power levels of the total signal that are associated with various frequencies in the frequency sub-band and with various instants in the time window, respectively,
  for at least one power level of the uplink messages, referred to as a "reference level", and considering uplink messages having the same spectral width, equal to a predefined reference spectral width, and having the same duration, equal to a predefined reference duration: calculating a maximum number $N_D$ of uplink messages that can be positioned on the spectrogram without interfering with one another, in respective positions for which the reference level verifies a predetermined detection criterion with respect to the power local level of the total signal,
  estimating the detection capability for the reference level as a function of the maximum number $N_D$ calculated for said reference level.

In particular modes of implementation, estimating the detection capability for a frequency sub-band includes detecting, in the total signal, uplink messages transmitted by terminals of the wireless communication system, and compensating for the reduction in the detection capability caused by the presence of said uplink messages in said total signal.

In particular modes of implementation, at least one quality-of-service spectral map is transmitted by a base station as a broadcast signal intended for a plurality of terminals.

In particular modes of implementation, at least one quality-of-service spectral map is transmitted by a base station as a point-to-point communication intended for a particular terminal.

In particular modes of implementation, when several base stations receive uplink messages from said particular terminal, only one of said base stations transmits the quality-of-service spectral map to said particular terminal.

In particular modes of implementation, the analysis method includes selecting one of the base stations receiving the uplink messages from said particular terminal, and only the quality-of-service spectral map determined for the selected base station is transmitted to said particular terminal.

In particular modes of implementation, the analysis method includes determining quality-of-service spectral maps for all or some of the base stations receiving the uplink messages from said particular terminal, and a combination of said determined quality-of-service spectral maps is transmitted to said particular terminal.

According to a second aspect, the present invention relates to a base station of a wireless communication system, including means configured to implement an analysis method according to any one of the modes of implementing the invention.

According to a third aspect, the present invention relates to an access network of a wireless communication system, including means configured to implement an analysis method according to any one of the modes of implementing the invention.

According to a fourth aspect, the present invention relates to a method for selecting, using a terminal of a wireless configuration system, a transmission frequency over which to transmit an uplink message to an access network of said wireless communication system, including:
  receiving at least one quality-of-service spectral map transmitted by the access network in accordance with any one of the modes of implementing the invention,
  selecting, as a function of the received quality-of-service spectral map, the transmission frequency within a frequency sub-band of the multiplexing band for which the quality-of-service criterion has been verified.

In particular modes of implementation, the selection method can further include one or more of the following features, taken separately or according to all the technically possible combinations.

In particular modes of implementation, the selection method includes receiving several quality-of-service spectral maps transmitted by the access network, which are associated with respective different quality-of-service levels, and the transmission frequency for the uplink message is selected as a function of the quality-of-service spectral map associated with the quality-of-service level corresponding to a quality-of-service level required for the uplink message to be transmitted.

In particular modes of implementation, selecting the transmission frequency includes the iteration of a random generation of a candidate frequency within the multiplexing band until obtaining a candidate frequency located within a frequency sub-band for which the quality-of-service criterion has been verified.

In particular modes of implementation, when the terminal receives quality-of-service spectral maps from different base stations of the access network, which are associated with a same quality-of-service level, the transmission frequency is selected as a function of a combination of said received quality-of-service spectral maps.

In particular modes of implementation, when the terminal receives quality-of-service spectral maps from different base stations of the access network, which are associated with a same quality-of-service level, the transmission frequency is selected as a function of a quality-of-service spectral map selected from said received quality-of-service spectral maps.

According to a fifth aspect, the present invention relates to a terminal of a wireless communication system, including means configured to implement a selection method according to any one of the modes of implementing the invention.

BRIEF DESCRIPTION OF THE DRAWINGS

The invention will be better understood upon reading the following description, given by way of example that is in no way limiting, and with reference to the figures wherein.

In these figures, references that are identical from one figure to another designate identical or similar elements. For reasons of clarity, the elements shown are not to scale, unless otherwise stated.

DETAILED DESCRIPTION OF EMBODIMENTS

Figure 1:
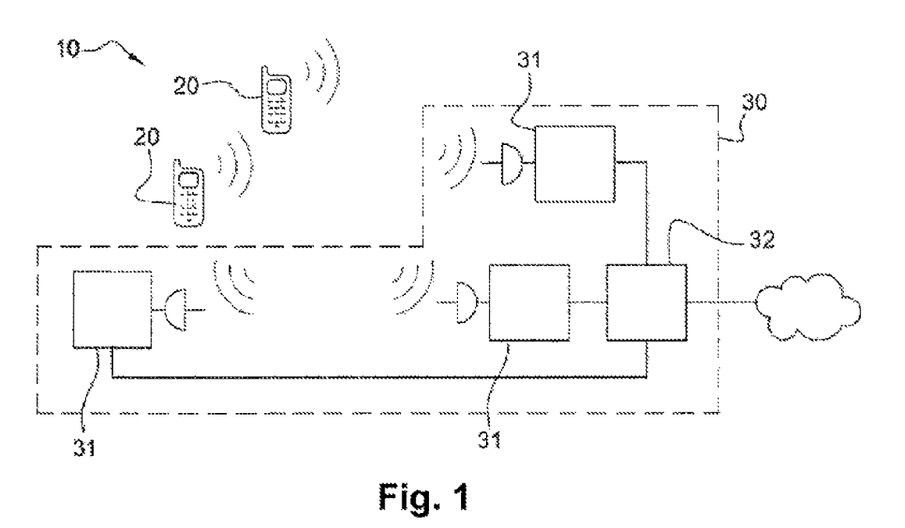
FIG. 1 is a schematic representation of a wireless communication system.

FIG. 1 schematically shows a wireless communication system 10, including several terminals 20 and an access network 30 including several base stations 31.

The terminals 20 and the base stations 31 of the access network 30 exchange data in the form of radio signals. "Radio signal" means an electromagnetic wave spreading via wireless means, the frequencies of which are in the traditional spectrum of radio waves (a few hertz to several hundred gigahertz).

The terminals 20 are suitable for transmitting uplink messages over an uplink to the access network 30. In the remainder of the description, the nonlimiting scenario is considered wherein the wireless communication system 10 has an ultra narrow band. "Ultra narrow band" (UNB) means that the instantaneous frequency spectrum of the radio signals transmitted by the terminals 20 has a frequency width less than one kilohertz.

The uplink messages from a terminal 20 are transmitted over transmission frequencies which are selected by said terminal 20 within a predetermined frequency band, called a "multiplexing band".

More particularly, the terminal 20 alone decides the transmission frequency for an uplink message, i.e. it transmits an uplink message over the selected transmission frequency without requesting prior authorization therefor from the access network 30. Thus, the access network 30 does not decide the allocation of the frequency resources within the multiplexing band, and it is the terminals 20 that decide to transmit over one transmission frequency rather than another.

The terminals 20 can also, in particular modes of implementation, decide the instants for transmitting the uplink messages and transmit the uplink messages at the selected transmission instants without requesting prior authorization therefor from the access network 30.

Thus, the terminals do not need to be synchronized with regard to frequencies and, where applicable, with regard to time with the access network 30. The complexity therefore rests mainly with the access network 30, while the terminals 20 can be simple and inexpensive to manufacture.

Preferably, to limit the measures undertaken, a terminal 20 transmits over a transmission frequency without prior verification of the availability thereof. However, there is nothing to rule out, according to other examples, a terminal 20 verifying, in advance, the availability of a transmission frequency, for example by measuring the power level on this transmission frequency and by comparing it to a threshold predetermined value.

Each base station 31 is suitable for receiving the uplink messages from the terminals 20 which are located within the range thereof. Each uplink message received in this manner is, for example, sent to a server 32 of the access network 30, possibly accompanied by other information like an identifier of the base station 31 that received it, the measured level of power of said received uplink message, the date of receipt of said uplink message, etc. The server 32 processes, for example, all of the uplink messages received from the various base stations 31.

Furthermore, the access network 30 is also suitable for transmitting, by means of the base stations 31, downlink messages over a downlink to the terminals 20, which are suitable for receiving them. The downlink messages are, for example, transmitted at the instigation of the access network 30. In such a case, the terminals 20 must constantly listen to the downlink, in anticipation of a possible downlink message. Alternatively or additionally, the access network 30 can also transmit downlink messages in response to received uplink messages. For example, the access network 30 can respond to each received uplink message, or respond solely to some received uplink messages (for example respond solely after having received a predefined number of uplink messages from a same terminal 20, or respond solely to uplink messages including a request to this effect, etc.).

Thus, according to the case in question, a downlink message transmitted by the access network 30 can be a total broadcast or multicast signal, or be part of a point-to-point communication between the access network 30 and a particular terminal 20.

As indicated above, the present invention relates to the management of the frequency resources in the wireless communication system 10, wherein the terminals 20 alone decide, and preferably by carrying out the least number of measures possible, the transmission frequencies over which they transmit uplink messages.

More particularly, the management of the frequency resources is distributed between the access network 30 and the terminals 20, and is broken down mainly into:

- a method 50 for analyzing, using the access network 30, the frequency resources within the multiplexing band, according to which said access network 30 generates information that it transmits to the terminals 20,
- a method 60 for selecting, using a terminal 20, a frequency for transmitting an uplink message as a function of the information received from the access network 30.

A) Method for Analyzing Frequency Resources

Figure 2:
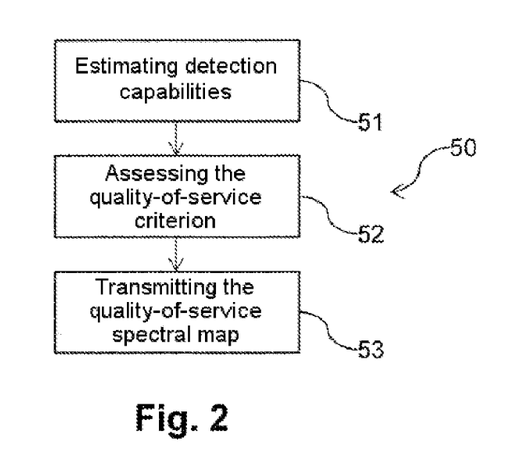
FIG. 2 is a diagram illustrating the main steps of a method for analyzing frequency resources.

FIG. 2 schematically shows the main steps of a method 50 for analyzing the frequency resources within the multiplexing band in which the terminals 20 transmit uplink messages.

As illustrated in FIG. 2, the analysis method 50 mainly includes the following steps, which will be described in greater detail hereafter:
- 51 estimating, for at least one base station 31 of the access network 30, capabilities for detection by said base station 31 of uplink messages in different frequency sub-bands, respectively, within the multiplexing band,
- 52 assessing, for each frequency sub-band, a predetermined quality-of-service criterion as a function of the detection capability estimated for said frequency sub-band,
- 53 transmitting, using the access network 30, a quality-of-service spectral map for said base station 31, representative of the frequency sub-bands for which the quality-of-service criterion has been verified and of the frequency sub-bands for which said quality-of-service criterion has not been verified.

From the various steps illustrated in FIG. 2, only the step 53 for transmitting the quality-of-service spectral map must necessarily be executed at least partially by a base station 31. The other steps illustrated in FIG. 2 can be executed by one or more base stations 31 and/or by the server 32 of the access network 30. For example, the steps 51 for estimating the detection capabilities and 52 for assessing the detection criterion can be executed by the server 32, which then sends each determined quality-of-service spectral map to the base station 31 which must transmit it.

In the remainder of the description, the nonlimiting scenario is considered wherein each base station 31 executes all of the steps illustrated by FIG. 2, and transmits the quality-of-service spectral map associated therewith as a broadcast signal (total or multicast).

Each base station 31 includes, for example, a processing circuit (not shown in the figures), including, for example, one or more processors and storage means (magnetic hard disk, electronic memory, optical disc, etc.) wherein a computer program product is stored, as a set of program code instructions to be executed in order to implement the various steps of the analysis method 50. Alternatively or additionally, the processing circuit includes one or more programmable logic circuits (FPGA, PLD, etc.), and/or one or more application-specific integrated circuits (ASIC), and/or a set of discrete electronic components, etc., which are suitable for implementing all or some of said steps of the analysis method 50.

Each base station 31 further includes wireless communication means allowing said base station to receive uplink messages transmitted by terminals 20, and to transmit downlink messages to terminals 20 of the wireless communication system 10. The wireless communication means are conventionally in the form of a radio circuit including equipment (antenna, amplifier, local oscillator, mixer, analogue filter, etc.) considered to be known to a person skilled in the art.

In other words, each base station 31 of the access network 30 includes means that are configured by software (specific computer program product) and/or hardware (FPGA, PLD, ASIC, discrete electronic components, radio circuit, etc.) in order to implement the various steps of the method 50 for analyzing frequency resources.

A.1) Estimating Detection Capabilities

During the estimation step 51, the base station 31 estimates detection capabilities associated with various frequency sub-bands, respectively, within the multiplexing band.

For example, the multiplexing band is broken down into $N_{SB}$ frequency sub-bands, preferably without overlap between them, and the collection of which corresponds to said multiplexing band. In the case of a UNB wireless communication system 10, the width of the multiplexing band is, for example, approximately 200 kilohertz (kHz), and the number $N_{SB}$ of frequency sub-bands is, for example, equal to 32 ($N_{SB}$=32), such that each frequency sub-band has a width equal to 6.25 kHz.

As a result, during the estimation step 51, at least $N_{SB}$ detection capabilities are determined. "Detection capability" means a quantity representing, for the frequency sub-band in question and the base station 31 in question, the probability that an uplink message, transmitted by a terminal 20 over a transmission frequency within this frequency sub-band, can be detected by this base station 31.

It is understood that various methods are possible for estimating such detection capabilities, and the choice of a particular method is only one alternative for implementing the invention.

According to a first example, the detection capability in a frequency sub-band can be estimated by means of a statistical analysis of the preceding uplink messages detected by the base station 31 in question. For example, the detection capability is estimated as being the packet error rate (PER) for a reference level $L_R$ of the power of the received uplink messages, i.e. the ratio between:
- the number of uplink messages received with the reference level $L_R$, in the frequency sub-band in question, but which have decoding errors,
- the total number of uplink messages received with the reference level $L_R$ in the frequency sub-band in question.

According to a second example, the detection capability in a frequency sub-band can be estimated to represent a ratio of signal to noise plus interference in the frequency sub-band in question, for a reference level $L_R$ of the power of the received uplink messages. For example, it is possible to measure the power level $L_{NI}$ of a total signal in the frequency sub-band in question over a time window, and to estimate the detection capability associated with this frequency sub-band as being the ratio $L_R/L_{NI}$.

Figure 3:
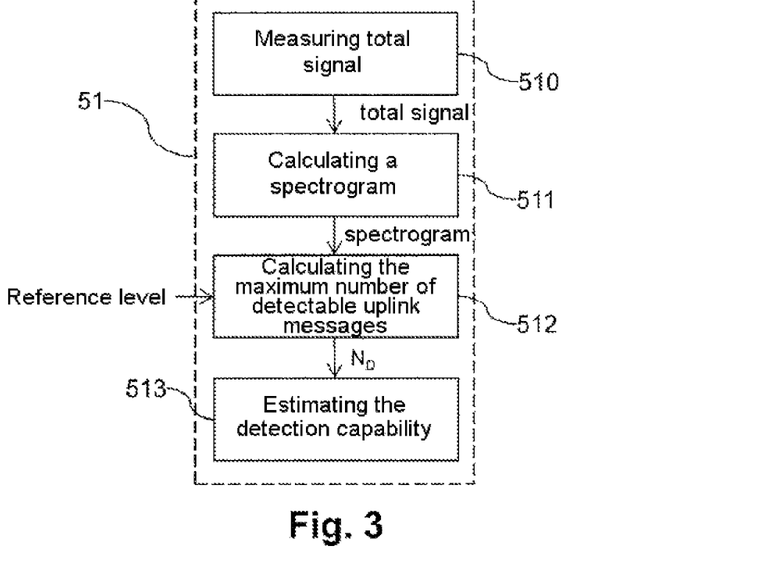
FIG. 3 is a diagram showing the main steps of a preferred mode of implementation for estimating a capability for detecting a frequency sub-band.

FIG. 3 schematically shows the main steps of a preferred mode of implementing the step 51 for estimating detection capability, wherein the detection capability in a frequency sub-band is estimated by taking into account certain characteristics of the uplink messages transmitted by the terminals 20. More particularly, in the example illustrated in FIG. 3, a reference spectral width $\delta F$ and a reference duration $\delta T$ of said uplink messages are considered.

For example, if the uplink messages transmitted by the terminals 20 all have the same spectral width, then this spectral width corresponds to the reference spectral width $\delta F$. If, by contrast, several spectral widths are possible for the uplink messages transmitted by said terminals 20, then the reference spectral width $\delta F$ corresponds, for example, to the maximum spectral width of said uplink messages, or to the mean spectral width of said uplink messages, or to the minimum spectral width of said uplink messages, etc. It is also possible to estimate several detection capability values that are associated with the various possible spectral widths, respectively, of the uplink messages.

In a similar manner, if the uplink messages transmitted by the terminals 20 all have the same duration, then this duration corresponds to the reference duration $\delta T$. If, by contrast, several durations are possible for the uplink messages transmitted by said terminals 20, then the reference duration $\delta T$ corresponds, for example, to the maximum duration of said uplink messages, or to the mean duration of said uplink messages, or to the minimum duration of said uplink messages, etc. It is also possible to estimate several detection capability values that are associated with the various possible durations, respectively, of the uplink messages.

In the case considered herein, by way of nonlimiting example, of a UNB wireless communication system 10, the reference spectral width $\delta F$ is less than one kilohertz, whereas the reference duration $\delta T$ is typically between a few tenths of a second and a few seconds.

As illustrated in FIG. 3, the step 51 for estimating detection capability includes, for each frequency sub-band of the multiplexing band, mainly steps of:
- 510 measuring a total signal representing all of the received radio signals, at the base station 31 in question, in the frequency sub-band in question over a time window,
- 511 calculating a spectrogram of the total signal, for at least one reference level $L_R$ of the uplink messages:
- 512 calculating a maximum number $N_D$ of uplink messages, received without interference between them, which can be detected at the base station 31 in question,
- 513 estimating the detection capability for the reference level $L_R$ as a function of the maximum number $N_D$ of detected uplink messages that is calculated for said reference level $L_R$.

The spectrogram of the total signal shows the spatial distribution of the power of the total signal in a frequency/time two-dimensional measurement space, defined by the frequency sub-band in question and by the time window in question.

The dimensions of the measurement space therefore correspond to the width $\Delta F$ of the frequency sub-band in question and to the duration $\Delta T$ of the time window in question. Preferably, the width $\Delta F$ of the frequency sub-band is greater than the reference spectral width $\delta F$ of the uplink messages, or even much greater than the latter (at least five times). If the reference spectral width $\delta F$ is less than one kilohertz, then the width $\Delta F$ is, for example, greater than 5 kilohertz. Preferably, the duration $\Delta T$ of the time window is greater than the reference duration $\delta T$ of the uplink messages, or even much greater than the latter (at least five times). If the reference duration $\delta T$ is in the second range, then the duration $\Delta T$ is, for example, greater than 30 seconds, or even greater than a few minutes.

In practice, the greater the duration $\Delta T$, the more precise is the estimation of the detection capability, in particular when there is intermittent interference.

For example, a discrete set of frequencies within the frequency sub-band in question and a discrete set of instants within the time window are defined. The frequencies of the discrete set are, for example, obtained by sampling the frequency sub-band with a predefined frequency step, and the instants of the discrete set are obtained by sampling the time window with a predefined time step. Preferably, the frequency step is equal to or less than the reference spectral width $\delta F$ of the uplink messages and the time step is equal to or less than the reference duration $\delta T$ of said uplink messages. Thus, a grid of points is formed in the measurement space, each point corresponding to a pair formed by a frequency and an instant of the discrete set.

The calculation of the spectrogram includes, for example, the calculation of Fourier transforms of successive blocks of samples of the digitized total signal and, possibly, the calculation at each point of the grid of the squared modulus of the value obtained by Fourier transform.

As a result, this spectrogram associates, with each point of the grid, a power level of the total signal at this point. "Power level" means any quantity representing the power of the total signal. In the remainder of the description, the nonlimiting scenario is considered wherein the power level corresponds to a power density per frequency unit, for example expressed in dBm/Hz.

Figure 4:
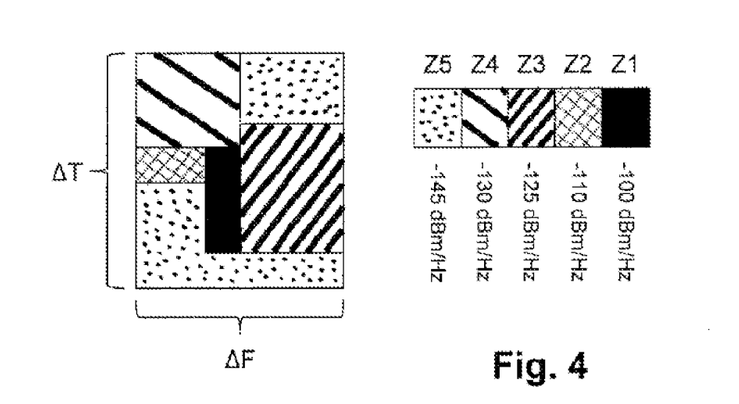
FIG. 4 is a spectrogram example calculated from a total signal measured in a frequency sub-band.

FIG. 4 shows a spectrogram simplified example. As illustrated in FIG. 4, the spectrogram includes five different zones:
- a zone Z1 for which the power level of the total signal is equal to or less than −100 dBm/Hz and greater than −110 dBm/Hz at each point of said zone Z1,
- a zone Z2 for which the power level of the total signal is equal to or less than −110 dBm/Hz and greater than −125 dBm/Hz at each point of said zone Z2,
- a zone Z3 for which the power level of the total signal is equal to or less than −125 dBm/Hz and greater than −130 dBm/Hz at each point of said zone Z3,
- a zone Z4 for which the power level of the total signal is equal to or less than −130 dBm/Hz and greater than −145 dBm/Hz at each point of said zone Z4,
- a zone Z5, separated, for which the power level of the total signal is equal to or less than −145 dBm/Hz at each point of said zone Z5.

Then, during the step 512, uplink messages which all have the same spectral width, equal to the reference spectral width $\delta F$, and the same duration, equal to the reference duration $\delta T$, are considered. Furthermore, there is calculation of the maximum number $N_D$ of uplink messages, received with the reference level $L_R$ in question, which can be positioned without interfering with one another in the measurement space, and which can be further detected given the total signal.

"Without interfering with one another" means that, when positioned in this manner, no uplink message prevents the detection of another uplink message. In the remainder of the description, the nonlimiting scenario is considered wherein the uplink messages, which have dimensions $\delta F$ by $\delta T$ in the measurement space, are positioned such that they do not overlap one another at all in said measurement space and therefore do not interfere with one another.

However, nothing rules out, according to other examples, allowing a partial overlap of the uplink messages with one another, on the edges of the uplink messages, if such a partial overlap does not prevent the detection of the uplink messages. It is also possible to adjust the reference spectral width $\delta F$ and the reference duration $\delta T$ in order to take into account the partial overlap below which no uplink message prevents the detection of another uplink message. For example, if the reference spectral width $\delta F$ represents the maximum spectral width of the uplink messages, then it is possible to choose, for said reference spectral width $\delta F$, a value that is slightly less than said maximum spectral width in order to take into account the partial overlap below which no uplink message prevents the detection of another uplink message (idem for the reference duration δT with respect, for example, to the maximum duration of the uplink messages).

As a result, an uplink message, positioned in this manner in the measurement space, is detected unless the power level of the total signal, at this uplink message, prevents this detection. Thus, it is considered that an uplink message can be detected if the reference level verifies a predefined detection criterion with respect to the power local level of the total signal.

Generally, any type of suitable detection criterion can be used. In particular modes of implementation, the detection criterion is considered to be verified at a point p of the measurement space if the following expression is verified:

$$L_R \geq L_G[p] + \Delta L \quad (1)$$

logarithmic scale expression in which:
$L_R$ corresponds to the reference level of the uplink messages,
$L_G[p]$ corresponds to the power level $L_G$ of the total signal calculated for the point p, given by the spectrogram,
$\Delta L$ corresponds to a power level predefined deviation.

The level ($L_G[p]+\Delta L$) corresponds, as a result, to the minimum level from which the detection criterion is verified, i.e. from which the uplink message in question can be detected.

In the remainder of the description, the nonlimiting scenario of the detection criterion for the expression (1) above is considered, considering a zero deviation $\Delta L$, i.e. it is considered that an uplink message can be detected as soon as the reference level is equal to or greater than the power local level of the total signal.

For a reference level, the detection criterion therefore makes it possible to distinguish, in the measurement space, zones, called "available zones" in which the detection criterion is verified and the uplink messages can be detected, and zones, called "disturbed zones", in which the detection criterion is not verified.

Figure 5:
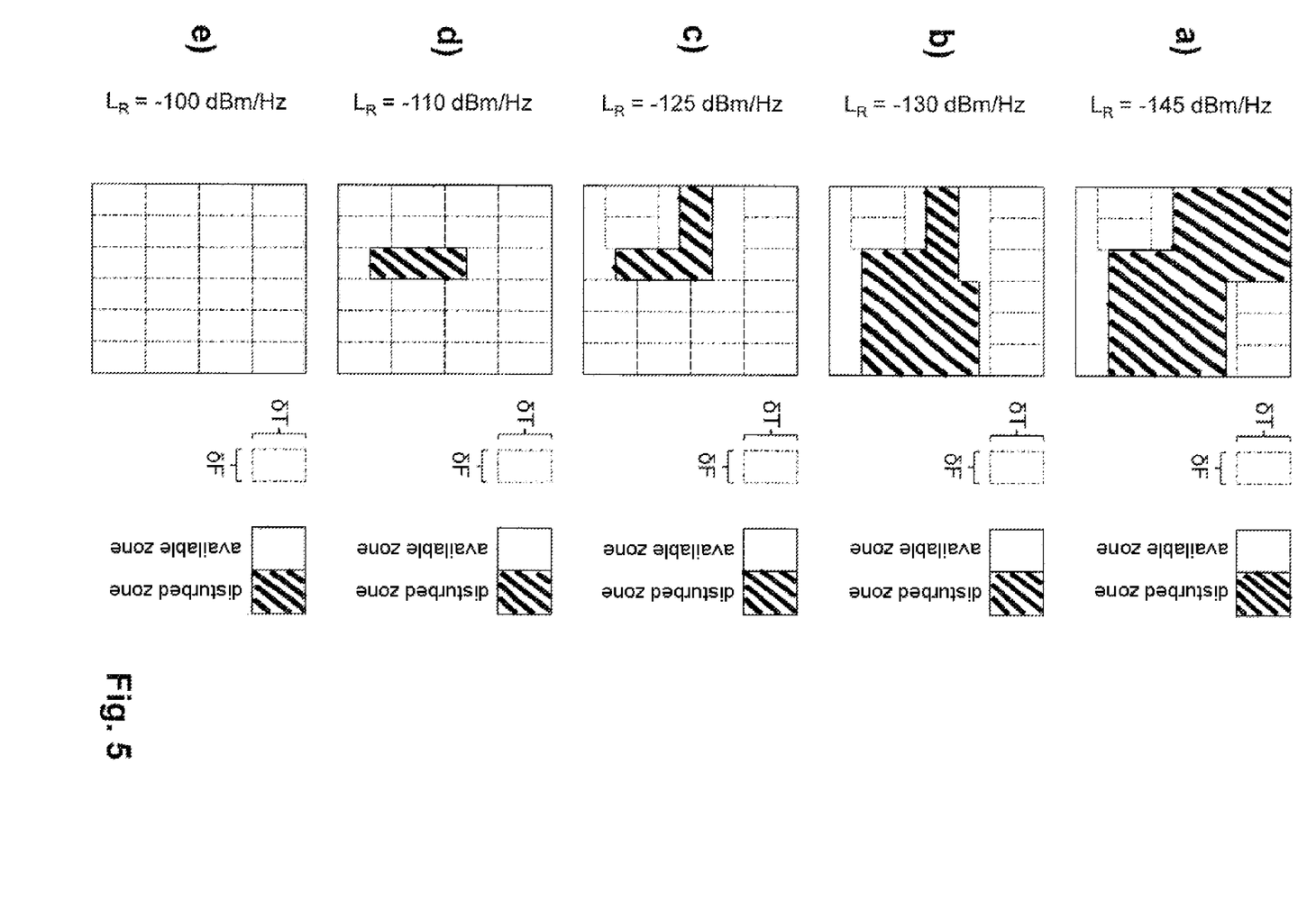
FIG. 5 is a schematic representation of available zones of the spectrogram of FIG. 4, for different power levels of the received uplink messages.

FIG. 5 shows the available zones (not hatched) and the disturbed zones (hatched) for various values of the reference level, in the case of the spectrogram illustrated in FIG. 4.

More precisely, in part a) of FIG. 5, the reference level is −145 dBm/Hz, such that, for the detection criterion in question, the available zone corresponds to the zone Z5, whereas the disturbed zone corresponds to the collection of the zones Z1, Z2, Z3 and Z4.

In part b), the reference level is −130 dBm/Hz, such that the available zone corresponds to the collection of the zones Z5 and Z4, whereas the disturbed zone corresponds to the collection of the zones Z1, Z2 and Z3.

In part c), the reference level is −125 dBm/Hz, such that the available zone corresponds to the collection of the zones Z5, Z4 and Z3, whereas the disturbed zone corresponds to the collection of the zones Z1 and Z2.

In part d), the reference level is −110 dBm/Hz, such that the available zone corresponds to the collection of the zones Z5, Z4, Z3 and Z2, whereas the disturbed zone corresponds to the zone Z1 only.

In part e), the reference level is −100 dBm/Hz, such that the available zone corresponds to the collection of the zones Z5, Z4, Z3, Z2 and Z1, i.e. the entire measurement space.

For a particular reference level, calculating the maximum number $N_D$ of uplink messages that can be detected therefore equates to determining the maximum number of uplink messages that can be placed within the available zones, without overlap with one another given the reference spectral width δF and the reference duration δT.

Reference 5 schematically shows, in broken line, the uplink messages, with dimensions δF by δT, which uplink messages are placed without overlap with one another in the available zones, for the optimum configuration, i.e. that which makes it possible to place the maximum amount of uplink messages. As illustrated in FIG. 5:
for the reference level −145 dBm/Hz (part a): $N_D=5$,
for the reference level −130 dBm/Hz (part b): $N_D=8$,
for the reference level −125 dBm/Hz (part c): $N_D=17$,
for the reference level −110 dBm/Hz (part d): $N_D=21$,
for the reference level −100 dBm/Hz (part e), the maximum number $N_D$ is equal to 24, and corresponds to the maximum number of uplink messages with dimensions δF by δT that can be placed without overlap one another in the measurement space.

The maximum number $N_D$ of uplink messages that can be detected, for a given reference level $L_R$, can be estimated using any suitable method. If the frequency step is equal to the reference spectral frequency δF and if the time step is equal to the reference duration δT, then it is sufficient to count the number of points inside the available zones. If this is not the case, then an uplink message is, for example, considered as being detectable if the detection criterion is verified at each point overlapped by this uplink message, i.e. over the entire spectral width (δF) of the uplink message and over the entire duration (δT) of said uplink message.

In the case of a UNB wireless communication system 10, the reference spectral width δF is very small, such that the frequency step can be chosen to be equal to said reference spectral width δF. The time step can, however, be chosen to be less than the reference duration δT, such that an uplink message overlaps M successive points of the measurement space along the time axis. In such a case, it is, for example, possible to carry out an analysis in each frequency of the discrete set, by crossing time axes, which are associated with the various frequencies, respectively, from the start of the time window up to the end thereof. Along each time axis, a counter, set to zero, is incremented each time that the detection criterion is verified, and said counter is reset to zero each time the detection criterion is not verified. When the detection criterion is verified for M successive points along a time axis, the corresponding counter is reset to zero, and a total counter of detected uplink messages, which is set to zero, is incremented. When the end of the time window is reached, the maximum number $N_D$ is given by the value of the total counter.

The maximum number $N_D$ of uplink messages that can be detected for the reference level $L_R$ in question is therefore calculated by assuming that all of the positions of the measurement space are possible for receiving an uplink message. This can be a strong approximation in some wireless communication systems. However, such a hypothesis is clearly verified, particularly, in the UNB wireless communication systems in which the terminals 20 transmit messages over arbitrary center frequencies and at arbitrary instants.

During the step 513, the detection capability for the reference level $L_R$ is estimated as a function of the maximum number $N_D$ of detected uplink messages that is calculated for said reference level $L_R$. For example, in a particularly simple mode of implementation, the detection capability is directly equal to the maximum number $N_D$.

In preferred modes of implementation, the detection capability is further estimated as a function of a maximum number $N_R$ of uplink messages that can be received without interfering with one another in the measurement space, assuming that the entire measurement space is an available zone.

The maximum number $N_R$ of uplink messages that can be received is, for example, calculated as a function of the reference spectral width $\delta F$ and of the reference duration $\delta T$ of said uplink messages, for example using the following expression for uplink messages positioned without overlap with one another:

$$N_R = E[\Delta F/\delta F] \cdot E[\Delta T/\delta T] \tag{2}$$

expression in which E[x] corresponds to the integer part of the real number x.

The detection capability is then estimated, during the step 513, as a function both of the maximum number $N_D$ of uplink messages that can be detected without overlap with one another and of the maximum number $N_R$ of uplink messages that can be received without overlap with one another.

For example, the detection capability can be estimated as being equal to the ratio $N_D/N_R$. Thus, the detection capability is always between 0 and 1, such that it is easy to compare in particular, for a reference level $L_R$, the detection capabilities in different frequency sub-bands. In the example illustrated in FIG. 5, the maximum number $N_R$ is given by the part e) and is equal to 24. As a result:

for the reference level −145 dBm/Hz (part a): $N_D/N_R = 0.21$,
for the reference level −130 dBm/Hz (part b): $N_D/N_R = 0.33$,
for the reference level −125 dBm/Hz (part c): $N_D/N_R = 0.71$,
for the reference level −110 dBm/Hz (part d): $N_D/N_R = 0.87$,
for the reference level −100 dBm/Hz (part e): $N_D/N_R = 1$.

It should be noted that it is possible that the total signal includes measured over the time window includes uplink messages transmitted from the terminals 20 of the UNB wireless communication system 10, and which, as a result, influence the value of the estimated detection capability. Two different approaches can then envisaged.

According to a first approach, it is considered that the uplink messages, transmitted by terminals 20 and present in the total signal, must be retained during the estimation of the detection capability, since these reduce the availability of the frequency sub-band in question for receiving other uplink messages. In such a case, the detection capability of a frequency sub-band is estimated as described above, without the aim of differentiating, in the total signal, the uplink messages and the interference. It should, furthermore, be noted that the influence of the uplink messages, transmitted by terminals 20 of the UNB wireless communication system 10 in the course of the measuring time window for the total signal, can be reduced by considering a duration $\Delta T$ of the time window that is much greater than the reference duration $\delta T$ of the messages (at least five times), or even significantly greater than it (at least one hundred times).

According to a second approach, it is considered that the uplink messages, transmitted by terminals 20 and present in the total signal, must be spaced apart during the estimation of the detection capability. In particular modes of implementation, the estimation of the detection capability for a frequency sub-band includes compensating for the reduction in the detection capability caused by the presence of said uplink messages in said total signal. For example, by considering a width $\Delta F$ of the frequency sub-band equal to 6.25 kHz, a duration $\Delta T$ of the time window equal to 10 minutes, a reference spectral width $\delta F$ equal to 100 Hz and a reference duration $\delta T$ equal to 2 seconds, then the maximum number $N_R$ is equal to 18750. As a result, by considering the detection criterion of the expression (1) above with a zero deviation $\Delta L$, then an uplink message, received with a power level greater than the reference level $L_R$, leads to a reduction in the detection capability of approximately 1/18750, namely approximately 0.53%. Thus, the detection capability for the reference level $L_R$ is, for example, calculated using the following expression:

$$\frac{N_D[L_R] + N_{MM}[L_R]}{N_R} \tag{3}$$

wherein:

$N_D[L_R]$ corresponds to the maximum number $N_D$ of uplink messages that can be detected for the reference level $L_R$, $N_{MM}[L_R]$ corresponds to the number of uplink messages detected in the used total signal, the power level of which is greater than the reference level $L_R$.

It is also possible to consider various reference levels for the uplink messages. In this case, several detection capabilities are estimated for each frequency sub-band of the multiplexing band, which are associated with the various reference levels, respectively, considered for the uplink messages.

A.2) Assessing the Quality-Of-Service Criterion

During the step 52, it is assessed, for each frequency sub-band, whether the estimated detection capability verifies a predetermined quality-of-service criterion, associated with a predetermined quality-of-service level.

It should be noted that various types of quality-of-service criteria are possible, and choosing a particular type of quality-of-service criterion is only one alternative for implementing the invention.

In preferred modes of implementation, assessing the quality-of-service criterion consists in comparing the estimated detection capability with a threshold predetermined value. In the case described above in which the detection capability is between 0 a 1, with the value 1 corresponding to the maximum detection capability, the quality-of-service criterion is considered to be verified if the detection capability is greater than said threshold predetermined value.

The threshold value in question can be chosen arbitrarily, for example equal to 80%, or be chosen such as to provide the detection by the access network 30 of a least one uplink message from a same terminal 20 over a predetermined duration period.

For example, in the case of terminals 20 used for the remote reading of meters, the receipt of an uplink message over a period of 4 weeks can prove to be sufficient. If terminals 20 are considered which transmit one uplink message per day (namely 28 uplink messages over a period of 4 weeks) and with the aim, for each terminal 20, of a 99.999% probability for detection of at least one uplink message every 4 weeks, then the detection capability $P_k[L_R]$ in the $k^{th}$ frequency sub-band in question ($1 \le k \le N_{SB}$) must be such that:

$$P_k[L_R] \ge 1 - \sqrt[28]{1 - 0.99999} \approx 33.7\%$$

In such a case, the quality-of-service criterion is considered to be verified, for the $k^{th}$ frequency sub-band in question, if the estimated detection capability $P_k[L_R]$ is equal to or greater than 33.7%.

If terminals 20 are considered which are used for the remote monitoring of buildings, in particular in the case where an anomaly has been detected (break-in, water or gas leak), then it can prove to be necessary to detect at least one uplink message over a period of 10 minutes. If terminals 20 are considered which transmit, in the case of detected anomaly, an uplink message every minute and with the aim, for each terminal 20, of a 99.9999% probability for detection of at least one uplink message over a period of 10 minutes, then the detection capability $P_k[L_R]$ in the $k^{th}$ frequency sub-band in question ($1 \leq k \leq N_{SB}$) must be such that:

$$P_k[L_R] \geq 1 - \sqrt[10]{1 - 0.999999} \approx 74.9\%$$

In such a case, the quality-of-service criterion is considered to be verified, for the $k^{th}$ frequency sub-band in question, if the estimated detection capability $P_k[L_R]$ is equal to or greater than 74.9%.

It is therefore understood that, if the aim is to receive at least one uplink message over a predetermined duration period, the threshold value to be considered is dependent upon the number of uplink messages transmitted per unit of time, which can vary from one use to another (for example one uplink message per day in the case of the remote reading of meters, one uplink message per minute in the case of the remote monitoring of buildings).

It should be noted that, preferably, the terminals 20 change transmission frequency with each transmission of an uplink message. The above calculations nevertheless remain valid in so far as each terminal 20 that is to provide a quality-of-service predetermined level will only choose frequency sub-bands for which the associated quality-of-service criterion has been verified.

More generally, it is possible to assess several predetermined quality-of-service criteria, associated with different quality-of-service levels, respectively. It is particularly possible to compare the detection capability with two different threshold values, for example 33.7% and 74.9%, in order to identify the frequency sub-bands to be favored for uses of the meter-remote reading type and the frequency sub-bands to be favored for uses of the building-remote monitoring type.

In the case where several detection capabilities have been estimated for each frequency sub-band, which are associated with various reference levels, respectively, it is possible to assess the quality-of-service criterion, as a function of the estimated detection capabilities, for each reference level considered for the uplink messages.

A.3) Quality-Of-Service Spectral Map Transmission

During the step 53, the base station 31 transmits at least one quality-of-service spectral map as a total broadcast or multicast signal, which quality-of-service spectral map is associated with a reference level $L_R$ for reception power of the uplink messages and with a quality-of-service predetermined level.

"Quality-of-service spectral map" means any type of information allowing a terminal 20 having received said quality-of-service spectral map to identify the frequency sub-bands for which the quality-of-service criterion has been verified and the frequency sub-bands for which said quality-of-service criterion has not been verified.

It is understood that various formats are possible for such a quality-of-service spectral map, and the choice of a particular format is only one alternative for implementing the invention.

In particular modes of implementation, the quality-of-service spectral map is, for example, transmitted as a word of $N_{SB}$ bits that are associated with the $N_{SB}$ frequency sub-bands, respectively, of the multiplexing band. For example, in this word of $N_{SB}$ bits, if the $k^{th}$ ($1 \leq k \leq N_{SB}$) bit is equal to 0, then this means that the quality-of-service criterion has not been verified for the $k^{th}$ frequency sub-band; if it is equal to 1, then this means that the quality-of-service criterion has been verified for the $k^{th}$ frequency sub-band. The word of $N_{SB}$ bits can be sent in a single operation, or sent over several operations, i.e. broken down into several parts transmitted in different downlink messages.

In particular modes of implementation, a same base station 31 can transmit, as a broadcast signal, several quality-of-service spectral maps. For example, the base station 31 can transmit quality-of-service spectral maps associated with different quality-of-service levels, respectively, and/or associated with different terminal 20 groups, respectively. For example, it is possible to transmit:

a first quality-of-service spectral map, to terminals 20 used for the remote reading of meters (required quality-of-service level: receipt of a least one uplink message per period of 4 weeks), a second quality-of-service spectral map, to terminals 20 used for the remote monitoring of buildings (required quality-of-service level: receipt of at least one uplink message per period of 10 minutes).

Alternatively or additionally, it is possible to transmit several quality-of-service spectral maps associated with different respective reference levels for the reception power of the uplink messages.

In the same manner, several possible formats can be envisaged to transmit several quality-of-service spectral maps, and choosing a particular format is only one alternative for implementing the invention. In particular modes of implementation, each downlink message including all or part of a quality-of-service spectral map can include an identifier of the associated quality-of-service level, for example in the form of a word of $N_{ID}$ bits, $N_{ID}$ being equal to $\log_2(N_{QoS})$, possibly rounded up to the nearest whole number if $N_{QoS}$, the number of different quality-of-service levels, is not a power of 2.

A.4) Alternatives for Implementing the Analysis Method

It should be noted that the modes of implementation above for the method 50 for analyzing frequency resources have been described as nonlimiting examples, and that alternatives can consequently be envisaged.

In particular, the invention has been described by considering the case where each base station 31 transmits, as a broadcast signal, at least one quality-of-service spectral map.

However, nothing rules out, additionally or alternatively, at least one base station 31 transmitting at least one quality-of-service spectral map as a point-to-point communication to a particular terminal 20. In preferred modes of implementation, the quality-of-service spectral map is transmitted in response to a quality-of-service spectral map request received from said particular terminal 20. Indeed, such arrangements make it possible to limit the duration for which said particular terminal 20 listens to the downlink, since it is then sufficient to listen to the downlink over a predetermined listening window with respect to the uplink message transmitted by said particular terminal 20.

It should be noted that the uplink messages from a particular terminal 20 are most often, in a UNB wireless communication system 10, received by several base stations 31. As a result, in the case of a transmission of the quality-of-service spectral map as a point-to-point communication, several different approaches can be envisaged for:

establishing the quality-of-service spectral map intended for said particular terminal 20, transmitting said quality-of-service spectral map to said particular terminal 20.

Indeed, it is understood that, by designating, with $N_{BS}$, the number of base stations 31 that receive the uplink messages from the particular terminal 20, it is possible to establish up to $N_{BS}$ quality-of-service spectral maps associated with said $N_{BS}$ base stations 31, respectively.

In preferred modes of implementation, a single quality-of-service spectral map, associated with a given reference level $L_R$ and a given quality-of-service level, is transmitted to said particular terminal 20.

According to a first example, the analysis method 50 includes selecting one of the $N_{BS}$ base stations 31, for example the base station that receives the uplink messages from said particular terminal 20 with the highest power level, and only the quality-of-service spectral map determined for the selected base station is transmitted to the particular terminal 20.

According to a second nonlimiting example, the analysis method 50 includes determining quality-of-service spectral maps for all or some of the $N_{BS}$ base stations 31, and a combination of said determined quality-of-service spectral maps is transmitted to said particular terminal 20. The quality-of-service spectral map determined in this manner by combination corresponds for example to:

the bringing-together of the various determined quality-of-service spectral maps: the quality-of-service criterion is then considered to be verified for a frequency sub-band as soon as it is verified for at least one of the base stations 31 considered from the $N_{BS}$ base stations 31, the intersection of the various determined quality-of-service spectral maps: the quality-of-service criterion is then considered to be verified for a frequency sub-band only if it is verified for all of the base stations 31 considered from the $N_{BS}$ base stations 31.

It should be noted that, in the examples above, some steps of the method 50 for analyzing the frequency resources are preferably executed by the server 32. For example, the server 32 can determine the quality-of-service spectral map that must be transmitted to the particular terminal 20.

Furthermore, in the case where the uplink messages from a particular terminal 20 are received by $N_{BS}$ different base stations 31, it is possible to use up to $N_{BS}$ different base stations 31 to transmit a quality-of-service spectral map to said particular terminal 20.

In preferred modes of implementation, only one of said $N_{BS}$ base stations 31 transmits the quality-of-service spectral map to said particular terminal 20.

Such arrangements make it possible to limit the interference generated over the downlink for transmitting a quality-of-service spectral map to said particular terminal 20.

Furthermore, in a UNB wireless communication system 10, the base stations 31 are preferably of the half-duplex type, in order to limit the deployment costs. Where applicable, a transmitting base station 31 is not capable of receiving uplink messages. It is therefore advantageous to limit as much as possible the number of base stations 31 which transmit the quality-of-service spectral map to the particular terminal 20, in order to reduce as much as possible the number of base stations 31 which are not available to receive uplink messages from other terminals 20.

In such a case, the analysis method 50 preferably includes selecting one of the $N_{BS}$ base stations 31, and only the selected base station 31 transmits the quality-of-service spectral map to said particular terminal 20, as a point-to-point communication.

The selected base station 31 is, for example, the base station that receives the uplink messages from said particular terminal 20 with the highest power level.

According to another nonlimiting example, the selected base station 31 is the base station theoretically making it possible, in the case of half-duplex-type base stations 31, to minimize the number of uplink messages that can be missed by the access network 30. In such a case, the base station 31 that transmits the quality-of-service spectral map is not necessarily that which has the best downlink quality with the particular terminal 20. Furthermore, the selected base station 31 is not necessarily that for which the transmitted quality-of-service spectral map has been determined, i.e. the selected base station 31 can transmit a quality-of-service spectral map associated with another of the $N_{BS}$ base stations 31.

It should be noted that, in the above examples, some steps of the method 50 for analyzing the frequency resources are preferably executed by the server 32. For example, the server 32 can select the base station 31 and send thereto the quality-of-service spectral map to be transmitted to the particular terminal 20.

A.5) Choosing the Reference Level

As indicated above, a quality-of-service spectral map, transmitted by a base station 31, is, for example, associated with a reference level $L_R$ for the reception power of the uplink messages.

The reference level $L_R$ can be chosen arbitrarily, for example in the case where the quality-of-service spectral map is transmitted as a total broadcast signal.

According to other examples, the reference level can be chosen as a function of measurements carried out on uplink messages received from terminals 20 of the UNB wireless communication system 10.

For example, in the case where the quality-of-service spectral map is intended for a particular terminal 20, for example transmitted as a point-to-point communication, then it is advantageous to optimize said quality-of-service spectral map for said particular terminal 20 in question. In preferred modes of implementation, the reference level $L_R$ in question is therefore calculated as a function of the power levels of the uplink messages received from said particular terminal 20. Considering that the uplink messages from said particular terminal 20 are received with a power level of mean value $\mu_0$ and of standard deviation $\sigma_0$, the reference level $L_R$ in question is, for example, equal to the value $(\mu_0 - d_0 \cdot \sigma_0)$, expression in which do is a natural number. Alternatively, the reference level $L_R$ in question is, for example, equal to the value $(v_0 - d_0 \cdot \sigma_0)$, expression in which $v_0$ corresponds to the median value of the power levels of the uplink messages received from said particular terminal 20.

Likewise, in the case where the quality-of-service spectral map is intended for a particular group of terminals 20, for example transmitted as a multicast signal, it is advantageous to optimize said quality-of-service spectral map for the terminals 20 belonging to the particular group in question. In preferred modes of implementation, the reference level $L_R$ in question is therefore calculated as a function of the power levels of the uplink messages received from all of the terminals 20 of the particular group. Considering that these uplink messages are received with a power level of mean value $\mu_1$ and of standard deviation $\sigma_1$, the reference level $L_R$ in question is, for example, equal to the value ($\mu_1 - d_1 \ \sigma_1$), expression in which $d_0$ is a natural number. Alternatively, the reference level $L_R$ in question is, for example, equal to the value ($v_1 - d_1 \cdot \sigma_1$), expression in which $v_1$ corresponds to the median value of the power levels of the uplink messages received from the terminals 20 of said particular group in question.

B) Method for Selecting a Transmission Frequency

The present invention also relates to a selection method 60, implemented by a terminal 20, for a transmission frequency over which to transmit an uplink message to the access network 30.

To this end, the terminal 20 includes a processing circuit (not shown in the figures), including one or more processors and storage means (magnetic hard disk, electronic memory, optical disc, etc.) in which a computer program product is stored, in the form of a set of program code instructions to be executed in order to implement the various steps of the transmission frequency selection method 60. Alternatively or additionally, the processing circuit includes one or more programmable logic circuits (FPGA, PLD, etc.), and/or application-specific integrated circuits (ASIC), and/or a set of discrete electronic components, etc., which are suitable for implementing all or some of said steps of the transmission frequency selection method 60.

The terminal 20 further includes wireless communication means allowing said terminal to transmit uplink messages and to receive downlink messages as radio signals. The wireless communication means are conventionally in the form of a radio circuit including equipment (antenna, amplifier, local oscillator, mixer, analogue filter, etc.) considered to be known to a person skilled in the art.

In other words, the terminal 20 includes a set of means that are configured by software (specific computer program product) and/or hardware (FPGA, PLD, ASIC, discrete electronic components, radio circuit, etc.) in order to implement the various steps of the selection method 60.

Figure 6:
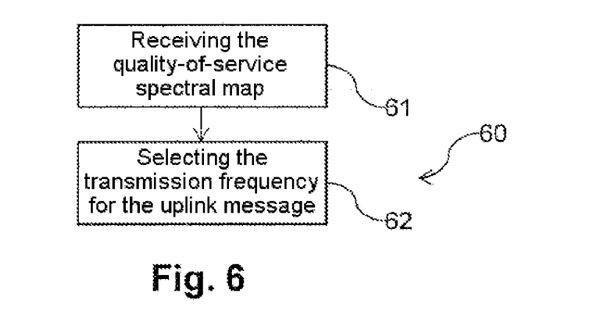
FIG. 6 is a diagram illustrating the main steps of a transmission frequency selection method.

FIG. 6 schematically shows the main steps of a transmission frequency selection method 60, which are:
- 61 receiving at least one quality-of-service spectral map transmitted by the access network 30,
- 62 selecting, as a function of the received quality-of-service spectral map, the transmission frequency within a frequency sub-band of the multiplexing band for which the quality-of-service criterion has been verified.

The terminal 20 therefore continues, as is the case in the prior art, to alone decide the transmission frequency over which to transmit an uplink message. However, thanks to the receipt of the quality-of-service spectral map, the selection carried out by the terminal 20 can favor some frequency sub-bands of the multiplexing band if it is necessary to provide a quality-of-service predetermined level.

For example, the selection of the transmission frequency uses a random generator of candidate frequencies that are distributed preferably uniformly within the multiplexing band. The random generator successively generates candidate frequencies until obtaining a candidate frequency that is located within a frequency sub-band for which the quality-of-service criterion has been verified, which is used as the transmission frequency for the uplink message.

If the terminal 20 receives several quality-of-service spectral maps associated with quality-of-service different respective levels, the transmission frequency for the uplink message is advantageously selected as a function of the quality-of-service spectral map associated with the quality-of-service level corresponding to a quality-of-service level required for the uplink message to be transmitted.

In the case where the terminal 20 receives quality-of-service spectral maps from different base stations 31, associated with a same reference level $L_R$ and with a same quality-of-service level, several approaches can be envisaged.

According to a first example, the transmission frequency is selected as a function of a combination of all or some of said received quality-of-service spectral maps, for example the bringing-together or the intersection of all or some of said received quality-of-service spectral maps.

According to a second nonlimiting example, the transmission frequency is selected as a function of a quality-of-service spectral map selected from said received quality-of-service spectral maps, for example that which has been received with the highest power level.

More generally, it should be noted that the modes of implementation and embodiments considered above have been described as nonlimiting examples, and that other alternatives can consequently be envisaged.

In particular, the invention has been described by mainly considering a UNB wireless communication system. However, there is nothing to rule out, according to other examples, considering other types of wireless communication systems.

The invention claimed is:

1. A method for analyzing, using an access network of a wireless communication system, frequency resources within a predetermined multiplexing band, the wireless communication system comprising at least one terminal configured to select on its own a transmission frequency, within the predetermined multiplexing band, over which to transmit an uplink message to the access network, the method comprising:
   estimating, for at least one base station of the access network, capabilities for detecting uplink messages in different frequency sub-bands, respectively, within the predetermined multiplexing band;
   assessing, for each frequency sub-band, a predetermined quality-of-service criterion as a function of a detection capability estimated for said each frequency sub-band;
   transmitting to said at least one terminal, using the access network, a quality-of-service spectral map for said at least one base station, representative of frequency sub-bands for which the quality-of-service criterion has been verified and of frequency sub-bands for which said quality-of-service criterion has not been verified, wherein the terminal can select on its own a transmission frequency based on said quality-of-service spectral map.

2. The method as claimed in claim 1, wherein for said each frequency sub-band, at least two different predetermined quality-of-service criteria are assessed as a function of the detection capability estimated for said each frequency sub-band; and
   wherein at least two quality-of-service spectral maps associated with said at least two different quality-of-service criteria, respectively, are transmitted using the access network.

3. The method as claimed in claim 1, wherein the detection capability in a frequency sub-band for said at least one base station is estimated as a function of a total signal representing all of radio signals received by said at least one base station in said frequency sub-band over a time window; and comprises steps of:

calculating a spectrogram representing power levels of the total signal that are associated with a plurality of frequencies in said frequency sub-band and with a plurality of instants in the time window, respectively;

for at least one power level of the uplink messages referred to as a reference level, and uplink messages having a same spectral width equal to a predefined reference spectral width and uplink messages having a same duration equal to a predefined reference duration: calculating a maximum number $N_D$ of uplink messages that can be positioned on a spectrogram without interfering with one another, in respective positions for which the reference level verifies a predetermined detection criterion with respect to a power local level of the total signal; and     estimating the detection capability for the reference level as a function of the maximum number $N_D$ calculated for the reference level.

4. The method as claimed in claim 3, wherein estimating the detection capability for the frequency sub-band comprises steps of detecting, in the total signal, uplink messages transmitted by terminals of the wireless communication system, and compensating for a reduction in the detection capability caused by a presence of said uplink messages in the total signal.

5. The method as claimed in claim 1, wherein at least one quality-of-service spectral map is transmitted by said at least one base station as a broadcast signal for a plurality of terminals.

6. The method as claimed in claim 1, wherein at least one quality-of-service spectral map is transmitted by said at least one base station as a point-to-point communication for a particular terminal.

7. The method as claimed in claim 6, wherein in response to reception of the uplink messages from said particular terminal by a plurality of base stations, only one of said plurality of base stations transmits said at least one quality-of-service spectral map to said particular terminal.

8. The method as claimed in claim 6, further comprising a step of selecting one of said plurality of base stations receiving the uplink messages from said particular terminal; and wherein only quality-of-service spectral map determined for the selected base station is transmitted to said particular terminal.

9. The method as claimed in claim 6, further comprising a step of determining quality-of-service spectral maps for all or some of said plurality of base stations receiving the uplink messages from said particular terminal; and wherein a combination of said determined quality-of-service spectral maps is transmitted to said particular terminal.

10. A base station of a wireless communication system comprising a processing circuit configured to implement an analysis method as claimed in claim 1.

11. The base station as claims in claim 10, wherein the processing circuit comprises at least one of (1) a processor and a memory, and (2) a programmable logic circuit.

12. An access network of a wireless communication system comprising at least one base station as claimed in claim 10.

13. A method implemented by said at least one terminal of said wireless communication system, for selecting the transmission frequency over which to transmit the uplink message to the access network of said wireless communication system, comprising steps of receiving at least one quality-of-service spectral map transmitted, by the access network, in accordance with claim 1; and selecting, as a function of said at least one quality-of-service spectral map, the transmission frequency within a frequency sub-band of the predetermined multiplexing band for which the quality-of-service criterion has been verified.

14. The method as claimed in claim 13, further comprising a step of receiving a plurality of quality-of-service spectral maps transmitted by the access network, which are associated respectively with different quality-of-service levels; and wherein the transmission frequency for the uplink message is selected as a function of a quality-of-service spectral map associated with a quality-of-service level required for a transmission of the uplink message.

15. The method as claimed in claim 13, further comprising a step iterating a random generation of a candidate frequency within the predetermined multiplexing band until a candidate frequency located within a frequency sub-band, for which the quality-of-service criterion has been verified, is obtained.

16. The method as claimed in claim 13, wherein in response to reception by said at least one terminal of quality-of-service spectral maps, associated with a same quality-of-service level, from different base stations of the access network, the transmission frequency is selected as a function of a combination of received quality-of-service spectral maps.

17. The method as claimed in claim 13, wherein in response to reception by said at least one terminal of quality-of-service spectral maps, associated with a same quality-of-service level, from different base stations of the access network, the transmission frequency is selected as a function of a quality-of-service spectral map selected from received quality-of-service spectral maps.

18. A terminal of a wireless communication system comprising a processing circuit configured to implement a selection method as claimed in claim 13.

19. The terminal as claims in claim 18, wherein the processing circuit comprises at least one of (1) a processor and a memory, and (2) a programmable logic circuit.

* * * * *